United States Patent [19]

Karim

[11] Patent Number: 4,568,575
[45] Date of Patent: Feb. 4, 1986

[54] SMOOTH-LOOK FOOTWEAR PROCESS

[75] Inventor: Karl A. Karim, Houston, Tex.

[73] Assignee: Shell Oil Company, Houston, Tex.

[21] Appl. No.: 603,023

[22] Filed: Apr. 23, 1984

[51] Int. Cl.$^4$ .............................................. B05D 3/02
[52] U.S. Cl. .................................. 427/393.5; 427/421
[58] Field of Search ............... 427/385.5, 393.5, 421; 106/192; 428/519

[56] References Cited

U.S. PATENT DOCUMENTS

| | | | |
|---|---|---|---|
| Re. 28,236 | 11/1974 | Hendricks et al. ................ | 36/2.5 R |
| 2,717,214 | 9/1955 | Marotta et al. ................ | 106/192 X |
| 2,870,035 | 1/1959 | Allen .................................... | 106/192 |
| 3,904,801 | 9/1975 | Harlan, Jr. ..................... | 428/519 X |
| 4,092,279 | 5/1978 | Piskoti ........................... | 427/393.5 X |
| 4,217,395 | 8/1980 | Kuan et al. .................. | 427/393.5 X |

Primary Examiner—Thurman K. Page
Attorney, Agent, or Firm—Peter A. Bielinski

[57] ABSTRACT

The present invention relates to a process for dulling molded block copolymer compositions comprising coating the surface of a molded block copolymer rubber composition with a dulling solution comprising a miscible quaternary mixture of a polymeric binder which is compatible with the molded block copolymer rubber composition, an azeotroping agent, water and a suitable solvent and evaporating the solvent.

15 Claims, 1 Drawing Figure

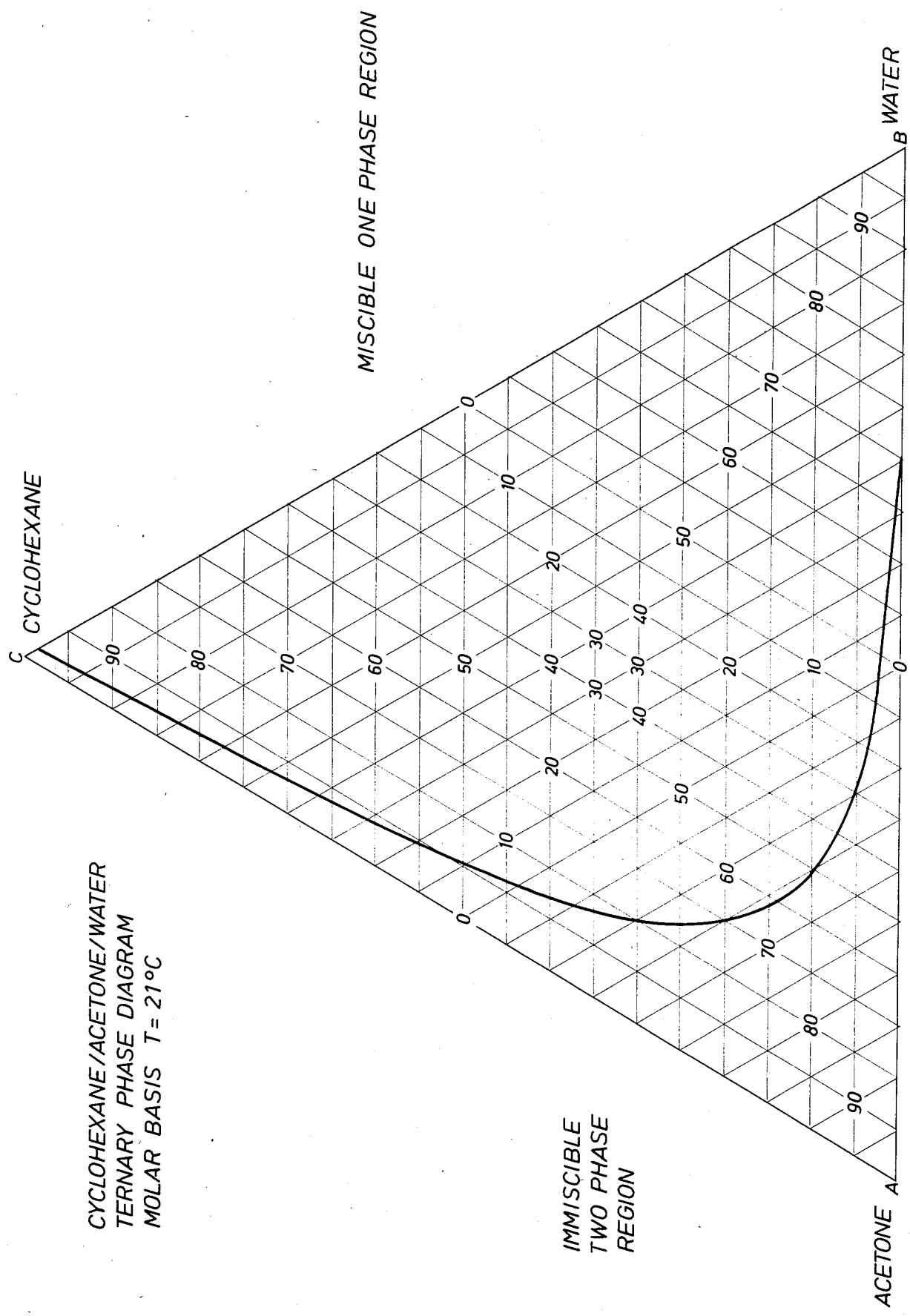

SMOOTH-LOOK FOOTWEAR PROCESS

BACKGROUND OF THE INVENTION

The use of certain block copolymers and their compounds in a number of end-uses and especially in footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, innersoles and the like. These compositions are disclosed in Hendricks et al., U.S. Pat. No. Re. 28,236. In general, these shoe component compositions usually comprise a mixture of block copolymer, extending oil, polystyrene and possibly a filler. For the most part, these block copolymer compositions have proven to be particularly advantageous in many respects, including flexibility, processability, lack of vulcanization requirement and wet slip. However, in certain respects, shortcomings have been noted. For example, commercial compounds should be free from delamination, free from elephant hide, and free from flow markings and marring. With respect to many styles in the casual and dress shoe areas of footwear, one of the major shortcomings of the block copolymer compounds such as those referred to in U.S. Pat. No. Re.'28,236 is the lack of a smooth appearance. Present block copolymer compounds lack the smooth, relatively unblemished surface which is characteristic of compression molded vulcanized conventional rubber, injection molded poly(vinyl chloride) or leather. A new process has now been found that produces a smooth dull surface and also is non-delaminating.

SUMMARY OF THE INVENTION

The present invention relates to a process for dulling molded block copoymer compositions comprising coating the surface of a molded block copolymer rubber composition with a dulling solution comprising a miscible quaternary mixture of a polymer binder which is compatible with the molded block copolymer rubber composition, an azeotroping agent, water and a suitable solvent and evaporating the solvent.

In order to dull the shiny surface of articles made of molded block copolymer rubber compositions a dulling or matting solution was developed. The present dulling solution produces a film or coating of the binder polymer on the molded article. This film contains imperfections created by the fine water particles trapped under and within the deposited film. The matting solution contains a rubber or copolymers thereof as a binder, a suitable hydrocarbon solvent an azeotroping agent and water. The process of dulling involves dipping the molded articles for a very short time in the matting solution followed immediately by drying. Other methods of treatment such as brushing or spraying may be used. The mechanism of dulling may be explained as follows: As the solvent evaporates small droplets of water are formed and are trapped by the binder film producing imperfections in the film. In addition to dulling the surface of molded block copolymer compositions, the above process may be used to eliminate the unsightly splashes or frostings on the surface of molded articles. Presently, the industry is using a "cleaning solution" based on methyl ethylketone. This solution is relatively expensive and difficult to commercialize and not as effective.

BRIEF DESCRIPTION OF THE DRAWING

The drawing shows the cyclohexane/acetone/water ternary phase diagram on a molar basis at a temperature of 21° C.

DETAILED DESCRIPTION OF THE INVENTION

The polymeric binder can be any polymeric composition which when applied in solution to the surface of the molded block copolymer composition will bind to the surface.

For styrene-butadiene based molded compositions a butadiene rubber or a styrene-butadiene block copolymer may be used as the binder.

The azeotroping agent in the solution is a carrier for water. The agent imparts miscibility by forming an azeotrope with the water and solvent. Suitable azeotroping agents include acetone and tetrahydrofuran. Acetone is preferred.

The solvent may be any solvent capable of dissolving the binder which has a reasonably high vapor pressure to avoid unreasonably long drying times. Preferred solvents are hydrocarbon or chlorinated hydrocarbon solvents for example methylcyclohexane, cyclohexane, ethyl benzene, toluene, tetrahydrofuran, carbon tetrachloride and carbon disulfide.

The dulling solution may be coated or applied to the surface of the molded composition by any convenient means. These means may include dipping spraying or brushing. The solution should be applied in a uniform coat so as to obtain uniform dulling. The amount of solvent may be varied so as to optimize for a particular method. Additional minor amounts of antioxidants, ultra-violet stabilizers and the like may also be added.

Molded articles should be dried immediately to prevent running or dripping. Drying can be accomplished by any convenient means, e.g., air jet drying with optional heat.

The concentration of the ingredients in the dulling solution must be formulated in such a way that all are mutually miscible. Possible concentrations or ratios can be predicted from thermodynamic phase diagrams for the particular liquid components used. For example, using acetone water and cyclohexane the possible concentrations which would be miscible are predictable from the ternary phase diagram identifying the critical limits of thermodynamic miscibility of acetone, cyclohexane/water mixture at 21° C. as shown in drawing I. For all concentrations which fall within the thermodynamic miscibility region there can be no phase separation, e.g., upon storage at the given temperature of 21° C. Concentrations of components falling in the immiscible region will exist as two phases. Concentrations can vary widely and must produce a one phase system.

Typical concentrations can be 50% to 90% by weight azeotroping agent, 9% to 49% solvent, 0.2 to 2% water and 0.1% 10% binder. Preferred composition of this invention in wt.% is 69.0 acetone, 29.4 cyclohexane, 0.6 water and 1.0 styrene butadiene block copolymer rubber.

ILLUSTRATIVE EMBODIMENT

A dulling solution was prepared by mixing 69 weight percent acetone, 29.4% cyclohexane, 0.6% water and 1.0% styrene-butadiene block copolymer rubber. The solution was coated onto molded styrene-butadiene block copolymer rubber shoe soles by dipping briefly in the solution. After air drying the molded shoe sole had a dull surface appearance.

What is claimed is:

1. A process for dulling molded block copolymer compositions comprising coating the surface of a molded block copolymer rubber composition with a dulling solution comprising a miscible quaternary mixture of a polymeric binder which is compatible with the molded block copolymer rubber composition, an azeotroping agent, water and a suitable solvent and evaporating the solvent.

2. The process of claim 1 wherein the molded composition in a styrene-butadiene block copolymer composition.

3. The process of claim 1 wherein the azeotroping agent is acetone.

4. The process of claim 1 wherein the azeotroping agent is tetrahydrofuran.

5. The process of claim 1 wherein the azotroping agent is present in the dulling solution in amounts between 50% and 90% by weight of solution.

6. The process of claim 1 wherein the solvent is a hydrocarbon solvent.

7. The process of claim 1 wherein the solvent is a chlorinated hydrocarbon solvent.

8. The process of claim 1 wherein the solvent is cyclohexane.

9. The process of claim 1 wherein the solvent is present at between 9% and 49% by weight of the solution.

10. The process of claim 1 wherein the dulling solution is applied by spraying.

11. The process of claim 1 wherein the molded composition is dipped in the dulling solution.

12. The process of claim 1 wherein the binder is a butadiene rubber.

13. The process of claim 1 wherein the binder is a styrene-butadiene copolymer.

14. The process of claim 1 wherein the binder is present at between 0.1% and 10.0%.

15. The process of claim 1 wherein the water is present at between 0.2 and 2.0%.

* * * * *